United States Patent Office 3,138,929
Patented June 30, 1964

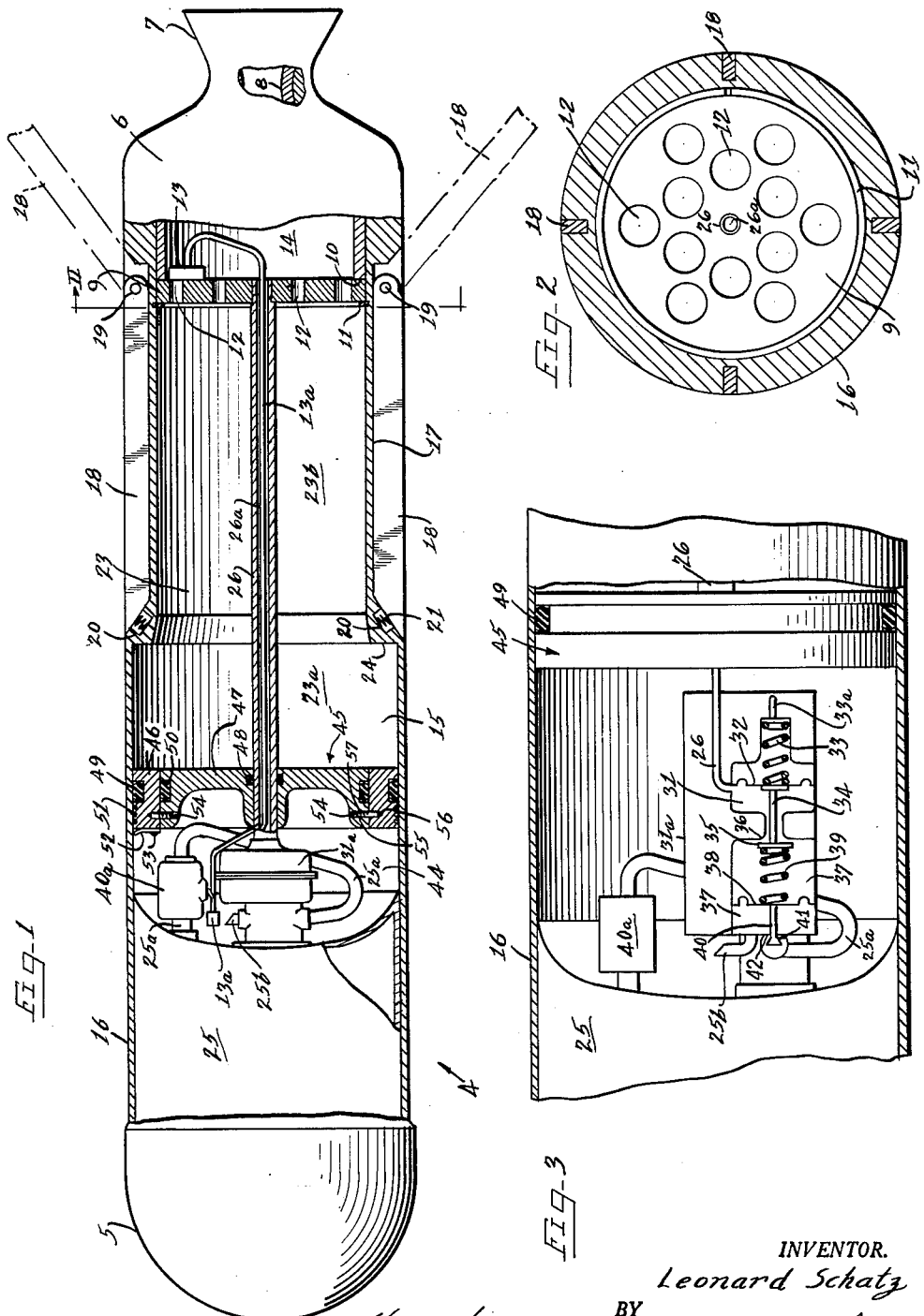

3,138,929
MULTIPLE STAGE EXPULSION PISTON
Leonard Schatz, University Heights, Ohio, assignor to Thompson Ramo Wooldridge Inc., Cleveland, Ohio, a corporation of Ohio
Filed Feb. 16, 1961, Ser. No. 89,875
6 Claims. (Cl. 60—39.48)

This invention relates to rockets, missiles and the like and is more particularly directed to improved methods and means for supplying fuel under pressure to a reaction chamber.

Difficulty has heretofore been encountered in the design of propellant pressurization systems for reaction motors in which the propellant storage container was of stepped internal diameter. A propellant tank or chamber having variable diameter or cross-sectional dimension may be required for a variety of applications. For example, reaction motor may require a plurality of cooling vanes which extend exteriorly of the body of the motor during flight but which, initially, are pivotally seated in slots formed in the casing of the propellant chamber of the reaction motor thereby necessitating a propellant chamber of two or more different diameters. In certain applications, stabilizing fins are seated in slots formed in the casing of the reaction motor and which, when the rocket is in flight, pivot outwardly for stabilization purposes.

In fuel supply pressurization systems for such reaction motors, therefore it is readily apparent that the normally employed pistons or expandable bladders are generally inoperative for such applications.

By employment of my invention wherein I utilize a plurality of piston members, each of which is sized to the diameter of a particular section of a propellant chamber of different cross-sectional area for supplying the propellant, liquid or gel, into the reaction chamber of a reaction motor, I substantially eliminate the problems and difficulties of the prior art.

It is therefore an object of the present invention to provide an improved reaction motor.

It is a still further object of the present invention to provide improved reaction motors having a propellant tank or container of variable cross-sectional dimension.

It is still another object of the present invention to provide a reaction motor fuel pressurization system for a fuel tank of variable cross-sectional dimension.

A further object of the present invention is to provide a propellant pressurization system operable for supplying monopropellant from a propellant tank of variable cross-sectional dimension.

A still further object of the present invention is to provide means for pressurizing a propellant fuel tank of variable cross-sectional dimension wherein the rate of flow of fuel into the reaction motor is constant.

Another object of the present invention is to provide improved methods for expelling fuel from a fuel tank of variable cross-sectional dimension.

These and other objects, features and advantages of the present invention will become apparent from a careful consideration of the following detailed description when considered in conjunction with the accompanying drawings wherein like reference numerals and characters refer to like and corresponding parts throughout the several views.

On the drawing:

FIGURE 1 is a cross-sectional view of a rocket constructed in accordance with the principles of the present invention.

FIGURE 2 is a view taken along lines II—II of FIGURE 1.

FIGURE 3 is a generally schematic view of the present invention illustrating a thrust control system for the rocket of FIGURE 1.

As shown on the drawings:

Briefly stated, the present invention involves improved methods and means for pressurizing a monopropellant, whether liquid or gel, from a propellant tank into the reaction chamber of a reaction motor.

As appears in FIGURE 1, a reaction motor system or rocket, generally indicated by the numeral 4 includes, at its forward end, a warhead 5 and at its rear end a reaction motor 6 and a discharge nozzle 7 for expelling the gaseous products of reaction from the reaction motor 6. The nozzle 7 is provided with a conventional throat insert 8, such as graphite, and an injection head 9 may be seated against the shoulder 10 provided by the reaction chamber and maintained in place by a snap ring 11 of conventional construction. The injection head 9 may be either the conventional nozzled head provided for liquid monopropellants or a flow splitter plate provided for gel propellants. The apertures 12 in the injection head 9 may be arranged in a plurality of concentric circles as clearly appears in FIGURE 2. Ignition means 13, such as a squib, may be connected to the injector head 9 or to the wall of the reaction chamber 14 as desired.

The components of the reaction motor thus far described are conventional components and do not form a part of the present invention. Positioned between the warhead 5 and the injector head 9 is a propellant tank 15 housing the liquid or gel monopropellant therein. The casing 16 of the propellant tank is provided with a plurality of annularly arranged slots 17, each of which is adapted to receive a stabilizing fin or vane 18 which is pivoted as at 19 to the casing 16. Each of the casing slots 17 communicates with a recess or slot 20 sized to receive a compression spring 21 which is adapted to urge the fin 18 outwardly. The fins or vanes 18 may be provided in any number desired, such as four spaced equally at 90° apart.

Thus, if the fin 18 is moved from its position shown by the dotted lines into the slot 17 and then inserted in a launching tube, the walls of the launching tube could be sized to maintain the fin 18 in the slot 17. Upon being fired, the rocket will leave the tube and, in leaving the tube, aerodynamic forces cooperate with the spring 21 to move the fin 18 from the slot 17 and position it as shown by the dotted lines in FIGURE 1.

It will be observed that the propellant chamber 23 comprises a section 23a of a first diameter and a section 23b of reduced diameter adjacent the injector head 9. The parting line between the propellant chambers 23a and 23b is defined by the shoulder 24.

Inwardly of the warhead 5 the propellant tank casing 16 houses a generally cylindrical container 25 which confines the pressurizing medium for forcing the propellant from the propellant tank 23. A suitable inert pressurizing medium, such as nitrogen, may be employed for this purpose and may be subjected to a pressure in vessel 25 at a level of about 3000 p.s.i.

The control apparatus for controlling the feed rate of the monopropellant fuel, whether liquid or gelatinous to the reaction chamber found useful in the present invention will now be described. Control apparatus for fuel feed rate may be made responsive to a comparison of the actual pressure in the reaction chamber with a predetermined desired reaction chamber pressure. Operation of such apparatus may readily be initiated in response to a remote command signal received from such means as an earth bound signal or the auto pilot or guidance unit, if employed, of the missile or rocket with which the reaction motor is associated.

The thrust produced by the rocket motor is a direct function of reaction chamber pressure which in turn is a function of the burning rate of the fuel. The burning rate of the fuel can be varied depending upon the rate at which the fuel is supplied to the combustion chamber. In order to maintain the thrust at a preselected desired value, a tube 26 may extend axially through the propellant chamber 23 and be secured at one end to the injection head 9 providing open communication with the reaction chamber and the interior of the tube 26a. The other end of line 26 may be in open communication with one side of a thrust regulator actuating chamber 31 (FIGURE 3) having a centrally positioned diaphragm 32 therein. An adjustable calibrated spring 33 urges the diaphragm 32 to the left as seen in FIGURE 3, whereas the combustion chamber gas pressure as applied through line 26 to the chamber 31 urges the diaphragm 32 to the right as seen in FIGURE 3. Mounted on the diaphragm 32 is a valve stem 34 and a valve 35 which may seat on a valve seat 36 at the inlet to the primary chamber 37 of the thrust regulator 31a. A second diaphragm member 38 may be positioned to divide the chamber 37 into two portions. A spring 39 is connected between valve 35 and one side of the diaphragm 38. A valve stem 40 carrying a valve 41 is connected to the other side of the diaphragm 38. Valve 41 is positioned to cooperate with a valve seat 42 at the inlet to the chamber 37 from the nitrogen line 25a leading from chamber 25 at a point where it enters the thrust regulator 31a.

In operation, the adjustable calibrated spring 32 is set for a desired value of thrust as by adjustment of the position of a plunger 33a bearing against spring 33. This loads the spring 33, diaphragm 32, valve stem 34, spring 39, and diaphragm 38 and valve stem 40 to open the nitrogen valve 41 so as to admit nitrogen under pressure through line 25a. A start and pressure reducing valve 40a is provided. It will be observed that the ignition line 13a passes through the axial bore of the tube 26 for actuation of the igniter 13.

The nitrogen leaving the line 25b enters a compartment 44 behind a piston assembly, generally indicated by the numeral 45.

The piston assembly 45 includes a plurality of concentric and generally cylindrical members 46 and 47. The inner cylindrical member 47 is bored as at 48 to receive the tube 26 and is in sliding contact therewith. Appropriate seals 49, 50 and 51 are provided to prevent flow of the nitrogen past these members into the propellant chamber 23 and to prevent flow of the propellant into the chamber 44.

A spring leaf member 52 may be secured as at 53 to the outer piston member 46 to prevent movement of the piston assembly 45 to the left as viewed in FIGURE 1.

To maintain the members 46 and 47 together during movement thereof along the propellant chamber section 23a of greater diameter, a plurality of shear pins 54 may be provided. The members 46 and 47 may be provided with a plurality of annularly spaced slots 55 and 56 respectively to receive the shear pins 54 which may be in threaded engagement as at 57 with the inner piston member 47.

Thus, the nitrogen leaving the gas line 25b moves the joined piston members 46 and 47 to the right as viewed in FIGURE 1 until the outer member 46 engages the shoulder 24 of the casing 16. The force applied by the nitrogen is sufficient to shear the pins 54 and thereby continue movement of the piston 47 which is sized to the reduced interior diameter of the chamber section 23b. Thus, during the transition period wherein fuel is being supplied only from the chamber section 23b, the applied force by the piston 47 continues the uniformity in flow rate of the propellant into the reaction chamber 14.

In operation, the fuel control system is actuated initially to move the piston assembly 45 to the right as viewed in FIGURE 1 whereby the fuel is extruded through the apertures 12 formed in the ejector head 9. It will be appreciated that burst diaphragms, not shown, may be inserted in the apertures 12 for storage purposes. The fuel flowing through the apertures 12 bursts the diaphragms and supplies the fuel to the reaction chamber 14. Simultaneously, the igniter 13 is actuated and burning of the monofuel commences. The reaction chamber pressure builds up in the reaction chamber and the pressure is communicated through the interior of the tube 26 to act on the diaphragm 32 and urge it toward the right in FIGURE 1 thereby tending to urge the valve 41 towards its closed position to reduce pressure of the nitrogen supplied through line 25b and thereby reduce the rate of fuel extrusion. When the desired value of rocket thrust has been achieved, as indicated by the desired value of combustion chamber pressure, the pressure acting on the left side of the diaphragm 32 is equal to the pressure applied to the right side of the diaphragm by spring 33 and the diaphragm 32 is then in equilibrium. In this equilibrium position, the valve 41 is positioned to maintain a nitrogen pressure sufficient to produce a rate of fuel extrusion which will just maintain the desired thrust. It will be appreciated that the linear fuel feed rate is at least as great as the burning rate of the fuel in the reaction chamber 14.

However, it will also be apparent that the pressure in nitrogen tank 25 itself falls as more and more nitrogen is used during the course of the rocket's travel. By way of example, the initial pressure of the nitrogen may be, as aforesaid, 3,000 p.s.i. and the final pressure at the end of the expulsion may be as low as 600 p.s.i. Such pressures may be used, for example, where it is desired to maintain a reaction chamber pressure of approximately 400 p.s.i. It is apparent that as long as fuel extrusion is desired to continue, the nitrogen pressure must be greater than the reaction chamber pressure in order to overcome the back pressure from the reaction chamber on the fuel.

It will also be appreciated that the thrust regulator calibrated spring 33 may either be permanently adjusted by manual means before firing the rocket in order to maintain a fixed predetermined value of thrust, or that any suitable remotely controlled actuating means may be provided to actuate the plunger 33a so as to vary the adjustment of the spring 33 to produce a programmed variation of thrust during the flight of the rocket. If, for example, it is desired to entirely stop reaction or reduce thrust to zero, the setting of the thrust regulator to a value less than the minimum value of combustion chamber pressure necessary to support combustion of the fuel is all that is required.

For any given setting of the adjustable thrust regulator spring 33, either a fixed or programmed variable setting, the control system shown in detail in FIGURE 3 acts as a servo-system to maintain the reaction chamber pressure at the desired value independently of changes in the nitrogen supply pressure from the tank 25 during the course of operation. Thus, assuming that immediately after the starting valve is opened, the system establishes the predetermined desired reaction chamber pressure in accordance with the mode of operation discussed above for the initial value of nitrogen pressure. Then, as the nitrogen pressure begins to decrease, the rate of fuel extrusion will also tend to decrease. This in turn tends to decrease reaction chamber pressure thereby permitting the diaphragm 32 to move to the left as seen in FIGURE 3 and thus tending to further open the valve 41 so as to compensate for the fall in pressure in tank 25 thereby increase the pressure applied to the piston assembly 45 to its original value. Of course, it will be understood that the original value of the pressure on the piston assembly 45 is less than either the initial or final value of pressure in tank 25 but is greater than the desired pressure in reaction chamber 14 in order to overcome the back pressure therefrom. The desired difference in value between the nitrogen pressure acting on the piston assembly 45 and the nitrogen pressure existing at the outlet of the pressure reducing valve 40a is maintained by varying the pressure drop through valve 41 in the manner described above.

Thus, as the piston assembly 45 moves to a position wherein the outer member 46 abuts the shoulder 24, the pins 54 are sheared and the pressure applied by the nitrogen gas moves the inner piston member 47 guided on the tube 26 into the propellant chamber section 23b without deleterious effects on the flow rate of fuel into the reaction chamber 14.

As aforementioned, the present invention has applicability for pressurization of liquid monopropellants and components of bi-propellant systems. In addition, the present invention has applicability to gel monopropellant systems. Such gel monopropellants are extrudable plastic viscous slurries or gelatinous materials. Numerous suitable monopropellant mixtures may be made into this form. Such mixtures preferably comprise a stable dispersion of a finely divided insoluble solid oxidizer in a continuous matrix of an oxidizable liquid fuel. The liquid fuel may be any oxidizable liquid, preferably an organic liquid containing carbon and hydrogen. Such liquid fuels include hydrocarbons such as triethyl benzene, dodecane and the like; compounds containing oxygen linked to a carbon atom such as esters including methyl maleate, diethyl phthalate, butyl oxalate and the like; alcohols such as benzyl alcohol, triethylene glycol and the like; ethers, such as methyl-o-naphthyl ether and the like, and others.

The solid oxidizer may be any suitable active oxidizing agent which yields an oxidizing element such as oxygen, chlorine, or fluorine readily for reaction for the fuel and which is insoluble in the liquid fuel vehicle. Such oxidizers include inorganic oxidizing salts such as ammonia, sodium and potassium perchlorate or nitrate and metal peroxides such as barium peroxide.

If desired, finally divided solid metal powders, such as aluminum or magnesium, may be incorporated in the monopropellant composition as an additional fuel component along with the liquid fuel. Such metal powders possess the advantages both of increasing the fuel density and improving the specific impulse of the monopropellant because of their high heats of reaction.

Gelling agents for imparting desired cohesiveness and flow characteristics to the plastic mixture include natural and synthetic polymers such as polyvinyl chloride, polyvinyl acetate, cellulose esters such as cellulose acetate, cellulose ethers, such as ethyl cellulose, metal salts of higher fatty acids such as the sodium or magnesium stearates and palmitates.

The amount of oxidizer is preferably at a stoichiometric level with respect to the liquid fuel, although minimum concentrations of solid oxidizer as low as 40% by weight are operative. In general, the oxidizer will constitute about 65% by weight of the mixture. A preferred operative gel monopropellant including a gel ingredient composed of up to 50% by weight of the liquid fuel, from 40% to about 65% by weight of an oxidizer and from 3% to about 10% of a gelling agent. A specific operative fuel may include about 50% by weight of solid oxidizers such as potassium perchlorate, about 45% by weight of liquid fuels such as triethyl benzene, and about 5% by weight of a gelling agent, such as ethyl cellulose. It is to be understood that this invention is not limited to use of any particular gel monopropellant mixture, but rather is directed to apparatus for pressurizing a gel or liquid fuel in supplying the fuel to a reaction chamber of a reaction motor.

Although various minor modifications might be suggested by those versed in the art, it is to be understood that I wish to embody within the scope of the patent warranted hereon all such embodiments as reasonably and properly come within the scope of my contribution to the art.

I claim as my invention:

1. A pressurization system adapted to supply a propellant to a reaction chamber comprising: a housing including the reaction chamber and a stepped propellant chamber having a first chamber section and a second chamber section, the first chamber section having a cross sectional area smaller than the cross sectional area of the second chamber section, said first chamber section communicating with said reaction chamber and being longitudinally positioned with regards to said second chamber, and a piston assembly in the second chamber section including an outer member sized to the second chamber section, an inner member sized to the first chamber section, and rupturable means joining the outer and inner members for movement along the second chamber section in response to a pressure applied to the piston assembly for supplying a propellant to the reaction chamber, said rupturable means being rupturable to permit movement of the inner member along the first chamber section to continue supply of the propellant to the reaction chamber.

2. A pressurization system adapted to supply a propellant to a reaction chamber comprising: a housing including the reaction chamber and a stepped propellant chamber having a first chamber section and a second chamber section, the first chamber section having a cross sectional area smaller than the cross sectional area of the second chamber section, said first chamber section communicating with said reaction chamber and being longitudinally positioned with regards to said second chamber, a piston assembly in the second chamber section including an outer member sized to the second chamber section, an inner member sized to the first chamber section and rupturable means joining the outer and innermost members for movement along the second section in response to a pressure applied to the piston assembly for supplying a propellant to the reaction chamber, said rupturable means being rupturable to permit movement of the inner member along the first chamber section to continue supply of the propellant to the reaction chamber, and means for controlling movement of the piston assembly in response to pressure conditions in the reaction chamber.

3. A pressurization system adapted to supply a propellant to a reaction chamber comprising: a housing including the reaction chamber and a stepped propellant chamber having a first chamber section and a second chamber section, the first chamber section having a cross sectional area smaller than the cross sectional area of the second chamber section, said first chamber section communicating with said reaction chamber and being longitudinally positioned with regards to said second chamber, a piston assembly in the second section including an outer member sized to the second chamber section, an inner member sized to the first chamber section, seal means carried by the outer member for preventing flow of a pressurizing medium between the wall of the second chamber section and the outer member, seal means carried by the inner member for preventing flow of a pressurizing medium between the outer and inner members and flow between the periphery of the inner member and the wall of the first chamber section, and rupturable means joining the outer and inner members for movement along the second chamber section in response to a pressure applied to the piston assembly for supplying a propellant to the reaction chamber, said rupturable means being rupturable to permit movement of the inner member along the first section to continue supply of the propellant to the reaction chamber.

4. A pressurization system adapted to supply a propellant to a reaction chamber comprising: a housing including the reaction chamber and a stepped propellant chamber having a first generally cylindrical chamber section and a second generally cylindrical chamber section, said first chamber section having a cross sectional area smaller than the cross sectional area of the second chamber section, said first chamber section communicating with said reaction chamber and being longitudinally positioned with regard to said second chamber section, and a piston assembly in the second generally cylindrical chamber section including an outer generally cylindrical member sized to the second chamber section, a generally cylindrical inner member concentric with said outer member and sized to the first chamber section and rupturable means joining the outer and innermost members for movement along the second section in response to a pressure applied to the piston assembly for supplying a propellant to the reaction chamber, said rupturable means being rupturable to permit movement of the inner member along the first chamber section to continue supply of the propellant to the reaction chamber.

5. A pressurization system adapted to supply a propellant to a reaction chamber comprising: a housing including the reaction chamber and a stepped propellant chamber having a first chamber section and a second chamber section, the first chamber section having a cross sectional area smaller than the cross sectional area of the second chamber section, said first chamber section communicating with said reaction chamber and being longitudinally positioned with regards to said second chamber, a piston assembly in the second chamber section including an outer member sized to the second chamber section, an inner member concentric with said outer member and sized to the first chamber section, rupturable means joining the outer and inner members for movement along the second section in response to a pressure applied to the piston assembly for supplying a propellant to the reaction chamber, said means being rupturable to permit movement of the inner member along the first section to continue supply of the propellant to the reaction chamber, an injecting head separating the reaction chamber from the first chamber section, said injection head having a plurality of apertures to feed propellant to the reaction chamber from the first chamber section, a tube connected to the injecting head and extending therefrom through the first chamber section to the second chamber section, said piston inner member being slidably connected to said tube to guide the piston inner member, means for applying pressure to the piston assembly to move the assembly towards the reaction chamber, means to regulate the pressure supplied to said piston assembly, and said tube connected to said regulating means and communicating with said reaction chamber to deliver gas from the reaction chamber to said regulating means to regulate the pressure supplied to said piston in response to the pressure conditions in said reaction chamber.

6. A pressurization system adapted to supply a propellant to a reaction chamber comprising: a housing including the reaction chamber and a stepped propellant chamber having a first chamber section and a second chamber section, the first chamber section having a cross sectional area smaller than the cross sectional area of the second chamber section, said first chamber section communicating with said reaction chamber and being longitudinally positioned with regards to said second chamber, a piston assembly in the second chamber section including an outer member sized to the second chamber section, an inner member sized to the first chamber section, and rupturable means joining the outer and inner members for movement along the second chamber section in response to a pressure applied to the piston assembly for supplying a propellant to the reaction chamber, said rupturable means being rupturable upon contact of the outer member with a shoulder of the housing defining the parting line between the first and second chamber sections to permit movement of the inner member along the first section to continue supply of the propellant to the reaction chamber, an injecting head separating the reaction chamber from the first chamber section, said injection head having a plurality of apertures to feed propellant to the reaction chamber from the first chamber section, a tube connected to the injecting head and extending therefrom through the first chamber section to the second chamber section, said piston inner member being slidably connected to said tube to guide the piston inner member, means for applying pressure to the piston assembly to move the assembly towards the reaction chamber, means to regulate the pressure supplied to said piston assembly, and said tube connected to said regulating means and communicating with said reaction chamber to deliver gas from the reaction chamber to said regulating means to regulate the pressure supplied to said piston in response to the pressure conditions in said reaction chamber.

References Cited in the file of this patent
UNITED STATES PATENTS

| | | |
|---|---|---|
| 2,818,914 | Thomann et al. | Jan. 7, 1958 |
| 2,858,672 | Clark | Nov. 4, 1958 |
| 2,971,097 | Corbett | Feb. 7, 1961 |
| 2,979,891 | Widell | Apr. 18, 1961 |
| 2,979,904 | Royer | Apr. 18, 1961 |